United States Patent [19]

Rengstorff

[11] 4,391,498

[45] Jul. 5, 1983

[54] SPECTACLE FRAME

[76] Inventor: Roy H. Rengstorff, 4844 Austin Rd., Aberdeen Proving Ground, Md. 21010

[21] Appl. No.: 59,923

[22] Filed: Jul. 20, 1979

[51] Int. Cl.³ .......................... G02C 5/14; G02C 5/22
[52] U.S. Cl. .................................... 351/121; 351/153; 351/111
[58] Field of Search .................. 351/97, 90, 121, 153, 351/111, 123; D2/234

[56] References Cited

U.S. PATENT DOCUMENTS

| 2,176,006 | 10/1939 | Ehrlich | D2/234 |
| 2,368,303 | 1/1945 | Johnson | D2/234 |
| 2,551,144 | 5/1951 | Lindemann et al. | 351/97 |
| 4,129,362 | 12/1978 | Lorenzo | 351/123 |

FOREIGN PATENT DOCUMENTS 2448842 4/1970 Fed. Rep. of Germany ........ 351/90

OTHER PUBLICATIONS

On Sports, Optometric Management, Jun. 1979, pp. 87,89,91,93,95,97 and 101.
Problems with Optical Inserts in Military Protective Masks, Rengstorff, Military Medicine,, vol. 145, No. 5, May 1980 pp. 334, 337.

Primary Examiner—John K. Corbin
Assistant Examiner—Rodney B. Bovernick
Attorney, Agent, or Firm—William G. Gapcynski; Werten F. W. Bellamy; John M. Petruncio

[57] ABSTRACT

A spectacle frame and method for providing eye protection during extreme physical activity through use of a spectacle frame comprising in combination rim means defining a pair of side-by-side viewing windows and having a recessed contoured bridge therebetween, temple yoke support means pivotally mounted to said rim means above and below each viewing window, and an expandable strap securing means connected to said temple yokes by means of slidable connector means which allow slidable adjustment of the angle of tilt of said frame relative to a wearer's face. In the preferred spectacle, the frame has a biconcave recessed bridge and the temple yokes are apertured to detachably mount on said rim means by snapping over temple pivot posts projecting upwardly and downwardly on said frame rim.

46 Claims, 3 Drawing Figures

SPECTACLE FRAME

DEDICATORY CLAUSE

The invention described herein may be manufactured, used, and licensed by or for the Government for governmental purposes without the payment to me of any royalty thereon.

BACKGROUND OF THE INVENTION

The invention relates to a ruggedly constructed spectacle frame for use during periods of extreme physical activity, particularly by military personnel during combat operations, and which can be used under protective face masks and headgear.

The invention also relates to an eyeglass frame which can be used by children and infants, as well as by persons participating in sports and occupations requiring the use of face masks, headgear and industrial eye protective devices.

The invention further relates to a spectacle frame comprising in combination rim means defining a pair of spaced side-by-side viewing windows and having a recessed contoured bridge therebetween, a temple yoke support means pivotly mounted to said rim above and below said viewing windows by means of temple pivot posts on said rim means and an adjustable strap having a connector means at the ends thereof for slidable connection to said temple yoke to allow varying angles of tilt of the frame relative to the face.

The invention also relates to a spectacle frame which does not restrict peripheral vision and freely conforms to the head over the temple to eliminate the large angle from the temple to the ear and thus allow use with protective gas masks, face masks and other headgear.

The prior art spectacle frame has remained substantially the same during the past two hundred years, namely consisting of a frame containing two lens inserts and two temple side arm or ear pieces which are attached to the frame by means of a metal hinge and pin or screw. These prior art spectacles require careful fitting to the face of the user by trained personnel and are subject to be easily damaged, misaligned or broken, particularly during physical activity. Elastic straps attached to the ends of the temple side arms have been used to hold spectacles on the user's face, but this method has been only partially successful in maintaining the eyeglasses in their proper position during extreme physical activity. Prior frames have also caused discomfort on the nose, eyelashes touching the lenses and lens fogging.

The long felt need for a ruggedly constructed spectacle frame has been particularly acute in the military where a large number of users have to operate under conditions of extreme activity and where the loss in time, expense and individual effectiveness due to the need for individual fitting of eyeglasses is of staggering proportions. Added to these problems is the need for providing tight fitting protective gas masks and other headgear which interfere with standard eyeglass frames. In particular, conventional eyeglass frames have a large angle from the temple to the ear and obstruct peripheral vision. When used under a mask, the prominent temple corners hit the mask, causing extreme discomfort due to pressure of the frame against the nose, and leakage of the mask at the sides of the head.

To overcome this problem of eyeglass use under protective masks, the military has had to design a number of optical "inserts" for difficult mask configuration which have to be mounted into the particular masks. These inserts require skilled fitting to the needs of the user and are not as a rule interchangeable between different mask designs. The quality of vision provided with these optical inserts is not good and the size of insert which can be accommodated in the mask has proven to be inadequate as well as uncomfortable for the wearer. The above disadvantages, coupled with the delays in obtaining and adjusting the optical inserts, have resulted in only limited use of these inserts for those personnel having the highest degree of visual impairment.

SUMMARY OF THE INVENTION

A spectacle frame for use during extreme physical activity comprising in combination a rim means defining a pair of side-by-side viewing windows and having a recessed contoured bridge therebetween, temple yoke support means pivotly attached to said rim above and below said viewing windows preferably by means of upper and lower temple pivot posts respectively projecting upwardly and downwardly above and below each viewing window and a securing means connected to said temple yokes for securing the frame to the wearer, the securing means preferably being an adjustable elastic strap having a means for slidably connecting the strap to said temple yoke to allow a wearer to adjust the angle of tilt of the frame relative to the wearer's face. A method of providing improved eye protection during extreme physical activity through use of a novel spectacle frame is also disclosed.

It is the principal object of this invention to provide a ruggedly constructed spectacle frame for use with or without eyeglass lenses which will remain aligned and undamaged while being worn during periods of extreme physical activity.

It is another object of this invention to provide a method for improved eye protection for adults and children, whether engaged in sports or in occupations requiring eye protection, i.e., the military, law enforcement fire protection and industrial manufacturing.

It is a further object of this invention to provide a spectacle frame which can be comfortably worn under a protective gas mask while maintaining the leak free integrity of the mask seal.

It is a still further object of this invention to provide a uniform, unisex spectacle frame which can be adjusted by the wearer without individual fitting by trained opticians.

These and other objects will become apparent from the following detailed description of the invention.

DESCRIPTION OF THE DRAWING

FIG. 1 shows the frame of this invention comprising an injection molded rim means 3, fabricated for example from nylon, defining a pair of spaced side-by-side viewing windows and a bridge therebetween adapted to engage the face of the wearer over the nose, e.g., a saddle contoured bridge. The viewing windows may be adapted to retain prescription or clear lenses, as in conventional spectacles. Alternatively, the frame may be used without lenses as an eye protection frame for use during sporting events, e.g., on racquet ball and handball courts. On the outer surfaces of the frame rim means are temple posts 4 respectively projecting upwardly and downwardly above and below each viewing window, which are used to hold detachable temple yoke supports 5. The detachable temple yoke supports 5 each have a pair of spaced limbs which are apertured to receive the temple pivot posts 4 and a central portion interconnecting said limbs. The temple yokes support the rim means in position on the wearer's face and are curved to conform to the area extending from the corner of the eye backwards to the temple region in front of the ear. A securng means, e.g., an adjustable temple strap 6 is connected to each of the temple yoke support means for securing the frame to the wearer with the temple yoke being held in close proximity to the temple contour of the wearer's head. The adjustable temple strap 6 made for example from neoprene rubber, is connected to the central portion of the temple yoke supports 5 by connector means 7 which preferably slides up and down on the yoke 5 to create a varying angle of tilt of the frame relative to the wearer's face. This adjustment can be made by the wearer to suit his preference without adjustment by trained optical personnel.

FIG. 2 shows the preferred frame of this invention comprising an injection molded nylon rim means 8 defining a pair of spaced side-by-side viewing windows adapted to receive lenses and having therebetween a biconcave recessed contoured bridge 9, e.g., a saddle bridge, adapted to engage the face of the wearer above the nose. In particular, the biconcave bridge 9 as shown further in the top view of FIG. 3, has a recessed concave front surface and a concave rear surface projecting rearwardly of said rim means to maintain a proper spaced relation to the wearer's face. This unique configuration allows the spectacle to conform closely to the face while maintaining the appropriate distance, i.e., 15 mm between the lenses and the eyes, thus avoiding fogging and eyelash contact with the lenses. On the outer surface of the rim means, projecting upwardly and downwardly above and below each viewing window, are upper and lower temple pivot posts 10 which are used to hold detachable temple yoke supports 11. The temple yokes 11 have a pair of spaced limbs joined by a central portion, said limbs being apertured to receive and snap over the temple pivot post 10 above and below each viewing window. The temple yoke supports are curved to conform to the area of the head extending from the corner of the eye backwards to the temple region in front of the ear. The frame is secured in close proximity to the temple contour of the wearer's head by means of an adjustable elastic temple strap securing means 12, e.g., a neoprene rubber strap which is slidably connected to the central portion of each temple yoke, i.e., interconnecting the yokes by a connector or coupling means 13. The connector means 13 is adapted to slide along the central portion of the yoke to create a varying angle of tilt of the frame relative to the wearer's eyes. The wearer can thus adjust the frame by simply changing the position of connector 13 on the temple yoke.

FIG. 3 shows a top view of the preferred frame of FIG. 2, particularly showing the biconcave shaped, recessed bridge 9. Bridge 9 has a concave shaped front surface for reducing overall thickness and weight of the frame rim and a concave contoured rear or inner surface projecting rearwardly from the rim and adapted to rest upon the wearer's face so as to maintain a proper spaced relation to the wearer's face.

Figure 1:
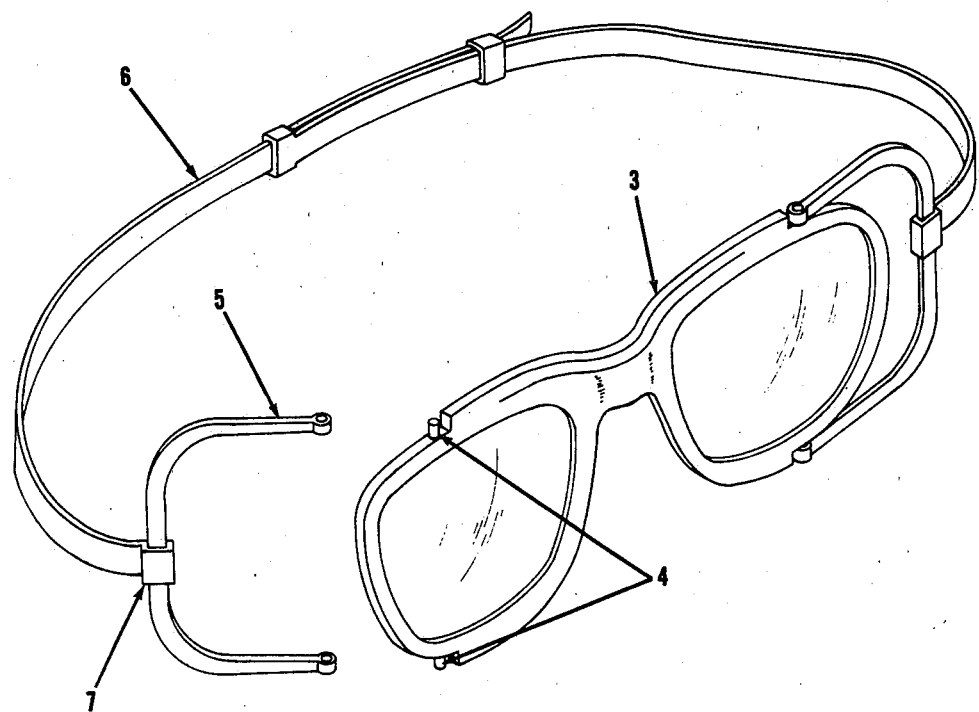
FIG. 1 is prospective view of the spectacle frame of this invention.
Figure 2:
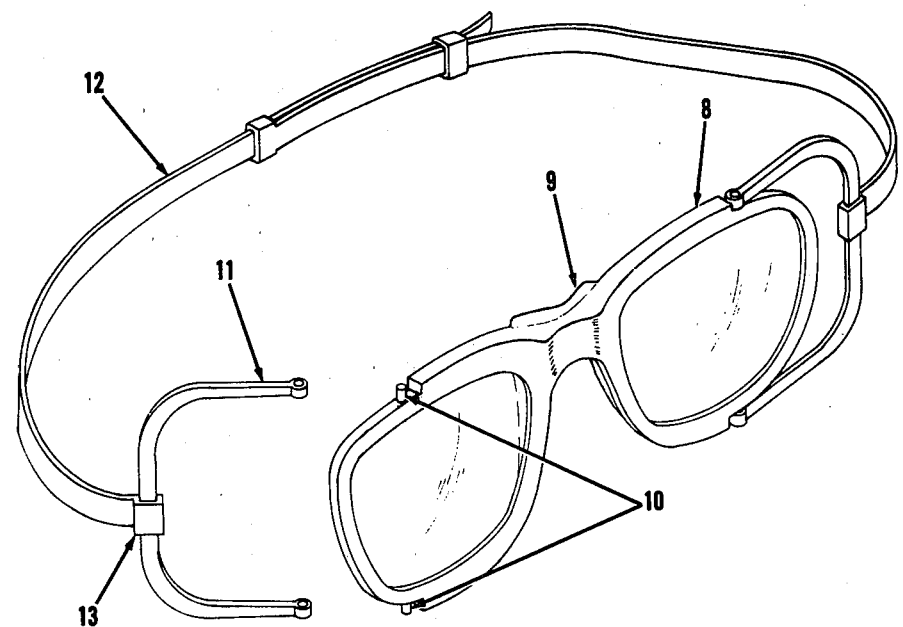
FIG. 2 is a prospective view of the preferred spectacle frame having a concave recessed bridge.
Figure 3:
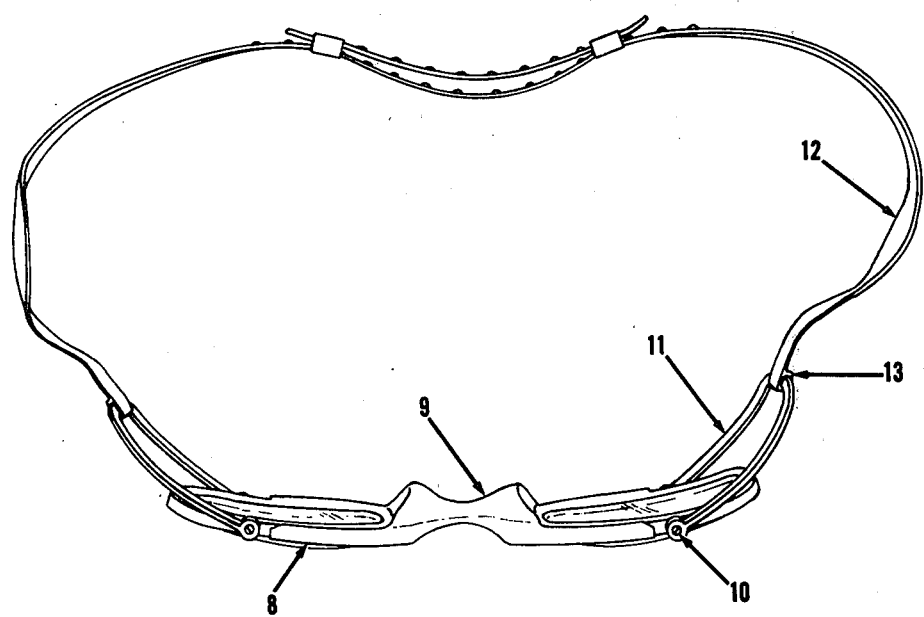
FIG. 3 is a top view of the preferred concave recessed bridge of the spectacle of FIG. 2.

The spectacle frame of this invention, with the exception of the rubber strap, is preferably made of nylon but any conventional eyeglass frame materials may be used. Thus, the frame may be fabricated by casting cellulose acetate or lath cutting metal in lieu of using injection molded nylon. In this preferred embodiment, a nylon frame is dulled to reduce shine and improve appearance. Nylon frames also allow lens insertion, removal and any reshaping to be accomplished with only hot water. Conventional cellulose acetate frames cannot use hot water for manipulation for lens insertion, but must instead rely on electrically heated glass beads, sand or salt.

The frame of this invention is preferably a unisex design, with a maximum wrap-around shape and a lens shape such as S-10 (10 mm less in the vertical dimension than the horizontal), e.g., one present military issue lens size is 46 mm × 36 mm. The bridge between the lenses can be of any shape, i.e., saddle or keyhole, and is contoured to fit most noses from 15 to 26 D.B.L. (distance between lens). The lens dimensions will cover all commercially available lens sizes and shapes, presently ranging from 32 mm for infants to 56 mm or larger for adults.

The bridge shape between the lenses is preferably of a concave recessed contoured saddle design with a concave shape projection on the inner surface which rests against the wearer's face. The bridge is recessed approximately 5 mm, effectively keeping the lenses approximately 15 mm from the eye, to keep eyelashes from touching the lenses and to avoid lens fogging which would otherwise occur when ordinary spectacles are held close to the bridge of the nose by any headstrap.

The two temple yokes have a pair of equal spaced limbs apertured to snap over the temple pivot posts on the top and bottom surfaces of the frame rim above and below each viewing window. Each yoke is curved and shaped to conform to the area extending from the corner of the eye backwards to the temple region in front of the ear. The temple yokes are made from a material which is sufficiently rigid to maintain its shape when pivoted beyond 180° and hold the yoke on the temple posts. The yoke can be secured on the temple pivot posts by a locking-type nub on top of the post, thereby eliminating the need for metal pins or screws to secure the yoke to the frame. The yoke, when attached to the frame, will pivot through a substantially completed circle of revolution around the temple pivot post, thus allowing the frame to flex when struck from the side and avoiding the problem of injury and breakage ordinarily encountered when conventional temple arms are struck or bent. The yoke thus permits these spectacles to be worn comfortably, even during sleep.

In replacing the conventional "ear pieces" of prior art spectacles with the freely moving flexing temple yokes of this invention, the spectacle can conform to the head over the temple area and thus eliminate the large angle from the temple to the ear which interferes with the use of protective gas masks and headgear and obstructs peripheral vision. The yoke must be large enough to be away from the corner of the eye and short enough not to interfere with masks or headgear.

The use of temple pivot posts, fabricated on the frame, e.g., during the injection molding, allows for easy detachment of the yoke to facilitate lens insertion, removal and replacement and avoids the need for metal screws, hinges and pins, which can be lost. Though the use of temple posts is preferred, the temple yokes can obviously be more permanently mounted on to the frame by means of a metal hinge and pin or screw. The temple yoke support means could of course be attached to the rim means in a fixed, non-pivotal manner if a less flexible design should be desired.

The preferred expandable strap securing means used with this invention is made of an elastic material preferably neoprene rubber and is adjustable to different head sizes. The neoprene rubber strap is preferred for use by the military or industry due to its greater strength, durability and resistance to damage caused by chemicals. The strap should also be relatively flat and extremely thin in cross section in the area where most protective masks make temple contact with the head to prevent gas permeation through the seal of the protective mask. The precise details of the strap construction are not, however, considered a part of the present invention and could be made of any elastic material. The need for a chemical resistant strap would not, of course, be essential to a spectacle for non-military use, e.g., a sports spectacle for adults and children, and can be replaced with various elastic materials. Though an expandable strap is preferred for use under protective headgear, other means can be connected to the temple yokes for securing the frame to the wearer while maintaining the temple yokes in close proximity to the temple contour of the face. A metal wire may be used as a securing means in a manner similar to the expandable strap by being interconnected to the temple yokes at the central portion of the yokes. It has been found that the temple yokes may also be secured to the head by means of conventional "rigged or hooked" type securing means. A ring type securing means, such as a "D" shaped ring which fits around the ear of the wearer, as presently used on frames by the Canadian military, can also be used as an effective securing means when connected to the temple yokes of this invention.

The elastic strap is slidably attached to the temple yoke to allow the strap to slide up and down on the yoke, thereby creating a varying angle of tilt of the frame relative to the wearer's eyes. Adjustment of the frame can therefore be made by the wearer to suit his preference thus eliminating the need for adjustment and fitting by trained personnel.

The spectacle of this invention has been found to meet the requirements of the military for rugged construction. During field tests, the spectacles have remained in place during extreme physical activity, such as running, jumping, falling and parachuting; when worn during periods of sleep and when worn with protective gas masks, helmets or other headgear. The invention thus allows the replacement of unsatisfactory dress civilian eyeglasses presently issued to approximately 50% of all military personnel and has eliminated the need for optical inserts for protective gas masks.

Applicant has developed a new spectacle frame which features a contoured bridge, preferably recessed, a removable temple yoke support means, an adjustable strap securing means and a lightweight frame with no metal parts.

Applicant having disclosed his invention, obvious modification will become apparent to those skilled in the related optics field. Applicant therefore wishes to be limited only by the scope of the appended claims.

I claim:
1. An eye protective frame comprising:
   a. rim means defining a pair of spaced, side-by-side viewing windows and a bridge therebetween, said bridge adapted to engage the face of a wearer;
   b. temple yoke support means attached to said rim means both above and below said viewing windows and inboard of the outer extremities of said rim means opposite said bridge a distance sufficient to provide for close proximity to the temple contour of the wearer's head upon support of said rim means in position on the wearer's face; and
   c. securing means connected to said temple yoke support means for securing the frame to the wearer with said temple yoke support means in close proximity to the temple contour of the wearer's head.
2. A spectacle frame comprising:
   a. rim means defining a pair of spaced, side-by-side viewing windows and a bridge therebetween, said bridge adapted to engage the face of a wearer, and each of said viewing windows adapted to retain a lens;
   b. temple yoke support means attached to said rim means both above and below said viewing windows and inboard of the outer extremities of said rim means opposite said bridge a distance sufficient to provide for close proximity to the temple contour of the wearer's head upon support of said rim means in position on wearer's face; and
   c. securing means connected to said temple yoke support means for securing the frame to the wearer with said temple yoke support means in close proximity to the temple contour of the wearer's head.
3. A frame according to claim 1 or 2 wherein said temple yoke support means comprises two yokes, one for each side of said frame, each of said yokes having a pair of spaced limbs, one of said limbs being attached to said rim means above its respective viewing window and the other limb being attached to said rim means below said window.
4. A frame according to claim 3 wherein said yokes are pivotally attached to said rim means.
5. A frame according to claim 4 wherein said rim means comprises upper and lower temple pivot posts respectively projecting upwardly and downwardly above and below each viewing window, and said yoke limbs are apertured to receive said pivot posts for pivotal attachment to said rim means.
6. A frame according to claim 5 wherein said limbs are detachably mounted on said posts.
7. A frame according to claim 3 wherein each of said yokes has a central portion interconnecting said limbs, and said securing means is connected to said central portion.
8. A frame according to claim 7 wherein said securing means is slidably connected to said central portion of each yoke for adjusting the angle of tilt of said frame relative to the wearer's face.
9. A frame according to claim 8 wherein said securing means is an adjustable elastic strap interconnecting said temple yokes.
10. A frame according to claim 9 wherein said strap is made of neoprene rubber.
11. A frame according to claim 1 or 2 wherein said rim means and temple yoke support means are made of nylon.
12. A frame according to claim 1 or 2 wherein said bridge projects rearwardly of said rim means to main- tain said rim means in proper spaced relation to the wearer's face.

13. A frame according to claim 12 wherein said bridge has concave rear and front surfaces.

14. A method of providing improved eye protection during periods of extreme physical activity comprising the step of providing a wearer with an eye protective frame comprising:
   a. rim means defining a pair of spaced, side-by-side viewing windows and a bridge therebetween, said bridge adapted to engage the face of a wearer;
   b. temple yoke support means attached to said rim means both above and below said viewing windows and inboard of the outer extremities of said rim means opposite said bridge a distance sufficient to provide for close proximity to the temple contour of the wearer's head upon support of said rim means in position on the wearer's face; and
   c. securing means connected to said temple yoke support means for securing the frame to the wearer with said temple yoke support means in close proximity to the temple contour of the wearer's head.

15. A method according to claim 14 wherein said temple yoke support means comprises two yokes, one for each side of said frame, each of said yokes having a pair of spaced limbs, one of said limbs being attached to said rim means above its respective viewing window and the other limb being attached to said rim means below said window.

16. A method according to claim 15 wherein said yokes are pivotally attached to the rim means.

17. A method according to claim 16 wherein said rim means comprises upper and lower temple pivot posts respectively projecting upwardly and downwardly above and below each viewing window, and said yoke limbs are apertured to receive said posts for pivotal attachment to said rim means.

18. A method according to claim 17 wherein said limbs are detachably mounted on said posts.

19. A method according to claim 15 wherein each of said yokes has a central portion interconnecting said limbs, and said securing means is connected to said central portion.

20. A method according to claim 19 wherein said securing means is slidably connected to said central portion of each yoke for adjusting the angle of tilt of said frame relative to the wearer's face.

21. A method according to claim 20 wherein said securing means is an adjustable elastic strap interconnecting said temple yokes.

22. A method according to claim 21 wherein said strap is made of neoprene rubber.

23. A method according to claim 14 wherein said rim means and temple yoke support means are made of nylon.

24. A method according to claim 14 wherein said bridge projects rearwardly of said rim means to maintain said rim means in proper spaced relation to the wearer's face so as to avoid discomfort when the frame is held close to the wearer's face.

25. A method according to claim 24 wherein said bridge has concave rear and front surfaces.

26. A method of providing improved eye protection and correction of vision during periods of extreme physical activity, particularly in conjunction with the use of protective face masks and headgear comprising the step of providing a wearer with a spectacle frame comprising:
   a. rim means defining a pair of spaced, side-by-side viewing windows and a bridge therebetween, said bridge adapted to engage the face of a wearer, and each of said viewing windows adapted to retain a lens;
   b. temple yoke support means attached to said rim means both above and below said viewing windows and inboard of the outer extremities of said rim means opposite said bridge a distance sufficient to provide for close proximity to the temple contour of the wearer's head upon support of said rim means in position on the wearer's face; and
   c. securing means connected to said temple yoke support means for securing the frame to the wearer with said temple yoke support means in close proximity to the temple contour of the wearer's head.

27. A method according to claim 26 wherein said temple yoke support means comprises two yokes, one for each side of said frame, each of said yokes having a pair of spaced limbs, one of said limbs being attached to said rim means above its respective viewing window and the other limb being attached to said frame below said window.

28. A method according to claim 27 wherein said yokes are pivotally attached to said rim means.

29. A method according to claim 28 wherein said rim means comprises upper and lower temple pivot posts respectively projecting upwardly and downwardly above and below each viewing window, and said yoke limbs are apertured to receive said posts for pivotal attachment to said rim means.

30. A method according to claim 29 wherein said limbs are detachably mounted on said posts.

31. A method according to claim 27 wherein each of said yokes has a central portion interconnecting said limbs, and said securing means is connected to said central portion.

32. A method according to claim 31 wherein said securing means is slidably connected to said central portion of each yoke for adjusting the angle of tilt of said frame relative to the wearer's face.

33. A method according to claim 32 wherein said securing means is an adjustable elastic strap interconnecting said temple yokes.

34. A method according to claim 33 wherein the adjustable strap is contoured to a thin edge with a relatively flat and extremely thin cross section in an area of the strap adapted to rest against the temple to allow maintenance of an essentially airtight seal of a protective mask worn over said spectacle frame.

35. A method according to claim 34 wherein said strap is made of neoprene rubber.

36. A method according to claim 26 wherein said rim means and temple yoke support means are made of nylon.

37. A method according to claim 26 wherein said bridge projects rearwardly of said rim means to maintain said rim means in proper spaced relation to the wearer's face to avoid lens fogging and discomfort when the frame is held close to the wearer's face.

38. A method according to claim 37 wherein said bridge has concave rear and front surfaces.

39. A spectacle frame which does not restrict peripheral vision and freely conforms to the head of a wearer over the temple thereby facilitating use with protective headgear including gas masks and face masks, said spectacle frame comprised of:

a. rim means defining a pair of spaced side-by-side viewing windows and a bridge therebetween;

said rim means comprising upper and lower temple pivot posts respectively projecting upwardly and downwardly above and below each viewing window;

said viewing window adapted to retain a lens;

said bridge adapted to engage the face of said wearer;

b. temple yoke support means attached to said rim means both above and below said viewing windows and inboard of the outer extremities of said rim means opposite said bridge a distance sufficient to provide for close proximity to the temple contour of the wearer's head upon support of said rim means in position on the wearer's face;

said temple yoke support means comprising two yokes, one for each side of said frame, each of said yokes having a pair of spaced limbs, each of said limbs comprising an aperture to receive a temple pivot post, one of said limbs being detachably mountable to said rim means above its respective viewing window at said upper temple post and the other limb being detachably mountable to said rim means below said window at said lower temple post;

each of said yokes being of a size sufficiently large to be away from the corner of a respective eye of the wearer and curved to conform to the temple region in front of the ear;

each of said yokes capable of pivoting through a substantially complete circle of revolution around the temple post when attached to said rim means thus allowing said frame to freely flex and conform to the head over the temple area of said wearer;

each of said yokes having a central portion interconnecting said limbs;

c. securing means connectable to said temple yoke support means for securing the frame to the wearer with said temple yoke support means in close proximity to the temple contour of the head of the wearer;

said securing means being an elastic strap slidably connectable to the central portion of each temple yoke thereby allowing for adjustment of the angle of tilt of the frame relative to the face of the wearer.

40. A spectacle frame according to claim 39 wherein said rim means and said temple yoke support means are made of nylon.

41. A spectacle frame according to claim 40 wherein said elastic strap securing means is adjustable and made of neoprene rubber.

42. A spectacle frame according to claim 39 wherein said bridge has a concave rear surface projecting rearwardly of said rim means sufficiently to avoid fogging and eyelash contact with said lens.

43. A spectacle frame according to claim 42 wherein said bridge is recessed approximately 5 mm thereby keeping said lens approximately 15 mm from a respective eye of said wearer.

44. A spectacle frame according to claim 39 wherein said temple pivot post comprises a locking-type nub.

45. A spectacle frame according to claim 39 wherein said connecting portion of said yoke is at substantially right angles to a respective pair of spaced limbs.

46. A spectacle frame according to claim 39 wherein said temple pivot posts are located substantially central to each respective viewing window.

* * * * *